US010948626B2

(12) United States Patent
Massonnat (10) Patent No.: US 10,948,626 B2
(45) Date of Patent: Mar. 16, 2021

(54) SIMULATION OF INSULAR KARSTIFICATION (71) Applicant: TOTAL SA, Courbevoie (FR)

(72) Inventor: Gérard Massonnat, Pau (FR)

(73) Assignee: TOTAL SA, Courbevoie (FR)

( * ) Notice: Subject to any disclaimer, the term of this patent is extended or adjusted under 35 U.S.C. 154(b) by 665 days.

(21) Appl. No.: 14/420,208

(22) PCT Filed: Aug. 6, 2013

(86) PCT No.: PCT/FR2013/051892
§ 371 (c)(1),
(2) Date: Feb. 6, 2015

(87) PCT Pub. No.: WO2014/023909
PCT Pub. Date: Feb. 13, 2014

(65) Prior Publication Data
US 2015/0219792 A1 Aug. 6, 2015

(30) Foreign Application Priority Data
Aug. 6, 2012 (FR) ..................................... 1257646

(51) Int. Cl.
*G01V 99/00* (2009.01)
(52) U.S. Cl.
CPC .................................. *G01V 99/005* (2013.01)
(58) Field of Classification Search
CPC .................................................. G01V 99/005
USPC ............................................................. 703/6
See application file for complete search history.

(56) References Cited

U.S. PATENT DOCUMENTS

2013/0185043 A1    7/2013   Massonnat et al.

FOREIGN PATENT DOCUMENTS

WO    WO 2012/045936 A2    4/2012

OTHER PUBLICATIONS

Jaquet et al. "Stochastic discrete model of karstic networks". Advances in Water Resources, vol. 27, Issue 7, Jul. 2004, pp. 751-760.*
Kang et al. "Lattice Boltzmann method for reacting flows in porous media." Advances in Applied Mathematics and Mechanics Adv. Appl. Math. Mech., vol. 2, No. 5, Oct. 2010. pp. 545-563. (Year: 2010).*
Ali, Syed A., William J. Clark, William Ray Moore, and John R. Dribus. "Diagenesis and reservoir quality." Oilfield Review 22, No. 2 (2010): pp. 14-27. (Year: 2010).*
International Search Report and Written Opinion for PCT/FR2013/051892, dated Feb. 12, 2014, 8 pages.
English translation of International Search Report and Written Opinion for PCT/FR2013/051892, dated Feb. 12, 2014, 9 pages.
(Continued)

*Primary Examiner* — Eunhee Kim
(74) *Attorney, Agent, or Firm* — Patterson Thuente Pedersen, P.A.

(57) ABSTRACT

The present invention relates to a method for simulating karstification phenomena in karst zones, especially in insular regions. This method defines a geological model of the karst zone and simulates the movement of a particle in the geological model, this movement being probabilistic. This method furthermore modifies the geological parameter depending on the movement of the particle and on the aggressiveness of the particle. The aggressiveness of the particle depends on the coordinates of the particle.

8 Claims, 8 Drawing Sheets

(56) References Cited

OTHER PUBLICATIONS

Reawei M et al: "Reactive transport modeling of calcite dissolution in the fresh-salt water mixing zone", Journal of Hydrology, North-Holland, Amsterdam, NL, vol. 311, No. 1-4, Sep. 15, 2005 (Sep. 15, 2005), pp. 282-298, XP027852124, ISSN: 0022-1694.

* cited by examiner

SIMULATION OF INSULAR KARSTIFICATION

RELATED APPLICATIONS

The present application is a National Phase entry of PCT Application No. PCT/FR2013/051892, filed Aug. 6, 2013, which claims priority from French Patent Application No. 12 57646, filed Aug. 6, 2012, said applications being hereby incorporated by reference herein in their entirety.

FIELD OF THE INVENTION

The present invention relates to the field of the simulation of geological processes for the study of the sub-soil. The interest is particularly focused on the karstification phenomena in insular karst zones.

BACKGROUND OF THE INVENTION

The expression "karstification of a rock" describes the phenomenon by which a rock is fashioned by the dissolving of carbonates, for example, in water. The water infiltrates through interstices of the rock, for example pores or fractures. This infiltration increases the size of these interstices because of the dissolving of carbonates of the rock in the infiltrated water. Fractures and cavities can thus be formed.

The water can typically be rainwater made acid by carbon dioxide from the atmosphere or from the ground. The water can originate from elsewhere, for example hydrothermal vents.

The rock can, for example, comprise limestone.

Moreover, particular karstifications can exist: insular, continental or even hydrothermal. The so-called "insular" karstification is a karstification produced notably in the particular areas formed by islands and the shoreline by the dissolving of the carbonates in the beat zone of the aquifer table and in the so-called saltwater wedge zone (area of chemical contact with fresh water and sea water).

A karst zone can be modeled statically, by using notably geological and seismic observations. In the case of the drilling of a well, data measured via the well, called well data, can be used to make a posteriori adjustments to the model of the karst zone. However, this approach is limited in that it does not dynamically reproduce the geological and hydrological processes leading to the formation of the karst, and in that the adjustment of the model with the well data can be relatively complex and sometimes unstable, notably in insular areas.

Furthermore, the simulations of karst zones in insular areas cannot be performed using the usual karst simulation tools. This is because the beats of the aquifer and the presence of a salt waterwedge are particular to insular and shoreline areas. These specific characteristics notably influence the formation of the karst in these areas.

There is therefore a need to improve the quality of the simulation of the karst formations of "insular" type.

The present invention improves the situation.

SUMMARY OF THE INVENTION

To this end, the present invention proposes simulating the karstification phenomena in a karst zone, typically insular.

The object of the present invention is, then, a method implemented by computer for simulating karstification phenomena in a karst zone.

This method comprises the following steps:
a/ receiving a geological model of the karst zone, this model comprising at least one local geological parameter that is a function of the local coordinates in this model;
b/ simulating the displacement of a particle in the geological model, said particle having coordinates in said model, said displacement being probabilized by taking into account:
  at least the local geological parameter, and
  at least one advective direction, this advective direction being a function of said coordinates of the particle in the geological model;
c/ modifying the geological parameter according to the displacement of the particle and according to an aggressivity of the particle.

The aggressivity of the particle is a function of the coordinates of the particle.

In particular, such a method makes it possible, from spot test wells, to reconstruct the karst zones by adding information between these wells. This method then makes it possible to know the zones of the subsoil exhibiting lithological characteristics likely to form hydrocarbon traps for example. In effect, the porous zones topped by an impermeable layer are notably likely to hold hydrocarbons or gas.

A "geological parameter" is a parameter of the model allowing for a representation of physical, lithological, mechanical, and other such properties. For example, this parameter can be the permeability of the rock, the diameter of the faults contained in the rock, the concentration of carbonates of the rock, etc. Furthermore, this geological parameter is called "local" when the value of this parameter can be a function of the current (or local) coordinates in the model. Thus, the geological parameter can have different values for the points of coordinates (x, y, z) and (x', y', z').

The aggressivity is, for example, the capacity of the particle to erode the rock. The aggressivity can thus be linked to the acidity of the particle. It can also be linked to the probability that the dolomite $CaMg(CO_3)_2$ contained in the rock is transformed into calcium carbonates $CaCO_3$.

A "geological model" is a representation of geological parameters (for example computerized) of a sub-soil. This model can, for example, be constructed from a plurality of borings (test wells) performed in the field. These borings can make it possible for geologists to establish a first estimated geological model of the sub-soil. Once established, this first geological model is converted into a second computerized model to allow for a simulation implemented by computer as described above. The latter model is therefore a representation of the geological characteristics of the sub-soil (permeability, etc.).

Furthermore, the geological model can define faults, a high zone through which the particles are introduced to perform the simulations, a height of salt water, the thickness of areas of mixing between the fresh water and the salt water, etc.

In one embodiment of the invention, the geological model can be meshed. Furthermore, the geological parameter can be a function of at least one mesh in contact with the displacement of the particle.

Advantageously, this geological parameter makes it possible to characterize certain physical or lithological properties of the rock in the neighborhood of the particle and therefore its displacement. This parameter can, for example, be the permeability of the rock or the diameter of the fractures present in proximity to the particle. The meshing can simplify the simulation through computer means, a large number of simulation programs natively processing the meshed models.

A mesh is said to be in contact with the displacement of the particle if the line defining the displacement of the particle between two simulation times satisfies one of the following conditions:

the intersection of this line with the volume (assuming a three-dimensional model or the surface assuming a two-dimensional model) defining the mesh is not emptied;

or the intersection of this line with one of the faces (assuming a three-dimensional model or one of the edges assuming a two-dimensional model) of the mesh is not empty.

In another embodiment of the invention, the geological parameter is a function of a direction in which the displacement of the particle is simulated.

In effect, certain directions of space can have different geological characteristics that can affect the displacement of the particle. Thus, a horizontal fracture, present in the geological model, will favor the horizontal displacement of the particle whereas it will have no effect on the vertical displacement.

Furthermore, the simulation of the displacement of the particle can be performed for a plurality of simulation times. The geological model defined can then be a function of this simulation time.

Advantageously, since the geological model changes, the inclusion of the karstification in time allows for a simulation close to the geological reality of the environment.

In effect, landslides, erosions, folding of geological layers, etc., can modify the relative position of the different rocks and thus of the karsts. By making the geological model change over time, a better match with the reality of the geological process can be obtained.

The steps b/ and c/ described above can also be performed for a plurality of particles.

Thus, the flow of a large number of particles simulated in the model can make it possible to give an account of lengthy periods of precipitation over time.

In a particular embodiment, the method can further comprise:

d/ determining a mixing zone between a first sub-part of the geological model and a second sub-part of the geological model, the first sub-part of the geological model modeling a sub-part comprising salt water and the second sub-part of the geological model modeling a sub-part comprising fresh water.

The first sub-part of the geological model modeling the sub-part comprising salt water can then comprise a zone adjacent to this mixing zone. The second sub-part of the geological model modeling the sub-part comprising fresh water can also comprise a zone adjacent to this mixing zone. Finally, the aggressivity of the particle can then exhibit a local maximum in the mixing zone in a zone resulting from the union of:

the adjacent zone of the first sub-part,
the adjacent zone of the second sub-part, and
the mixing zone.

Thus, a mixing zone can be determined in the model. This mixing zone, the boundary between the salt medium and the medium containing fresh water, comprises salty water (that is to say water with a salt content substantially less than that of sea water). Such a zone lends itself to the dissolving of soft rocks and, consequently, the aggressivity of the particles exhibits a local maximum in a zone close to this mixing zone. Such a modeling of the aggressivity of the particles makes it possible to advantageously take into account this zone comprising salty water.

As a variant, the simulation of the movement of the particle is performed for a plurality of simulation times. At least one sub-part out of the first sub-part and the second sub-part is a function of this simulation time.

In effect, the boundaries of the aquifer and of the zones containing salt water can change over time (years, centuries, etc.) because of arid or wet/rainy periods. This variation consequently causes the position and the thickness of the mixing zones, and therefore of the zones in which the particles have great aggressivity, to evolve.

A computer program, implementing all or part of the method described above, installed on pre-existing equipment, is in itself advantageous since it makes it possible to effectively simulate the karstification phenomena in a karst zone, typically insular.

Thus, another object of the present invention is a computer program comprising instructions for the implementation of the method described previously, when this program is run by a processor.

Figure 6:
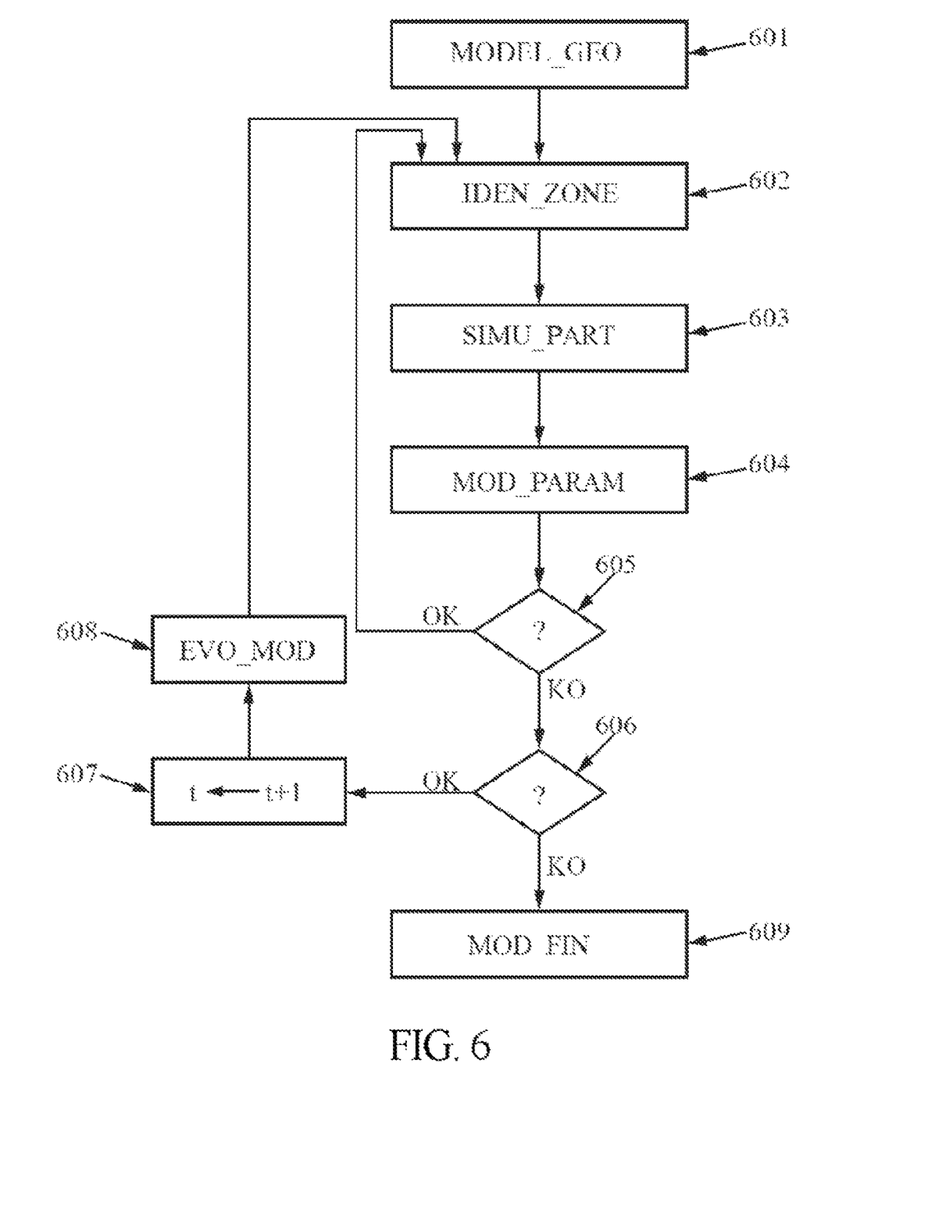
FIG. 6 is an example of a flow diagram of a simulation method within the meaning of the invention.

FIG. 6 described in detail hereinbelow can form the flow diagram of the general algorithm of such a computer program.

A device, for implementing all or part of the method described above, is in itself advantageous, since it makes it possible to effectively simulate the karstification phenomena in a karst zone, typically insular.

Other features and advantages of the invention will become more apparent on reading the following description. The latter is purely illustrative and should be read in light of the attached drawings in which:

DETAILED DESCRIPTION OF THE DRAWINGS

In an insular or shoreline area, the subsoil can be made up of carbonated rocks. In this illustration, the soil 100 forms an island surrounded by a sea 110 made up of salt water. The sea level is defined by a horizontal line 101 (or a horizontal plane in three dimensions) in FIGS. 1a and 1b.

Figure 1A:
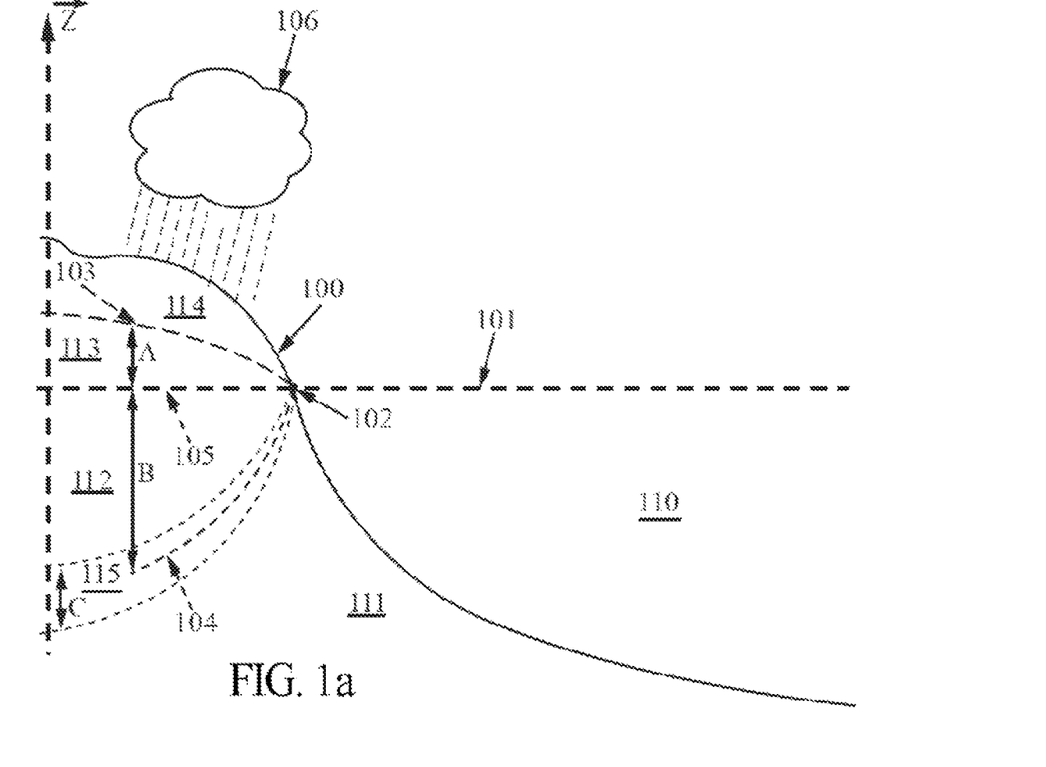
FIGS. 1a and 1b are cross-sectional representations of a shoreline area likely to allow the formation of karst of "insular" type.
Figure 1B:
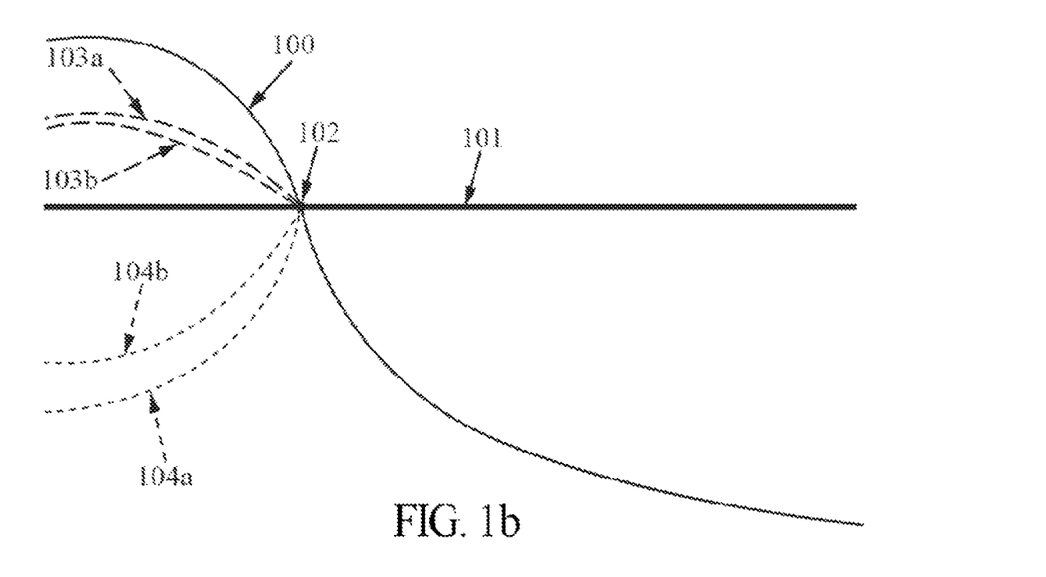

The carbonated rock is permeable and therefore constitutes an aquifer in which water can circulate. Because of the permeability of the rocks, two types of water are present therein:

salt water, present in a first zone 111, from the sea, present at the edges of the continent, which infiltrates into the carbonated aquifer of the island through the faults and fractures;

fresh water, present in a second zone 112 and a third zone 113, fed by the infiltrations of precipitations 106 and from the rivers, which flow from a zone of infiltration.

These zones 112 and 113 correspond to the water table.

The fourth zone 114 is not permanently saturated with water. The fresh water flows into these zones along a hydraulic gradient from a high point (situated at the summit of the island for example) to the outlet 102.

The interface between the zones 113 and 114 is called the piezometric surface 103.

According to the laws of fluid behavior, the fresh water, lighter than salt water, floats on the salt water. The delimitation of the zones 112 and 111 defines a plane 104 called "salt water wedge". The theoretical geometry of this salt water wedge 104 follows a so-called "Ghyben-Herzberg" law which defines the position of the interface between two media in balance.

According to this law, the relationship linking A and B, respectively the distance of the interface 103 (piezometric surface) from the virtual sea level 105 and the distance of the interface 104 (saltwater wedge) from the virtual sea level 105, is $p_d(B+A)=p_s B$ with $P_d$ being the density of fresh water and $P_s$ being the density of salt water. Thus, according to this law B has an approximate value of 40A in conventional conditions (i.e. $p_d$ 1,000 g/cm$^3$ et $p_s$ 1,025 g/cm$^3$).

More often than not, the system is not static. In effect, the sea is subject to tidal oscillations (the period of which can be daily, monthly, annual, centennial, etc.) and the aquifer (zones 112 and 113) can vary according to the resupplying of the freshwater table. FIG. 1b is an example of variation of the interfaces 103 and 104. For example, in the case of heavy precipitations, the aquifer is greatly charged with fresh water and the interface 103a (high piezometric surface) is relatively high. Consequently, and according to the "Ghyben-Herzberg" law, the interface 104a (low saltwater wedge) is fairly deep. In case of dry weather, the aquifer is little charged with fresh water and the interface 103b (low piezometric surface) is relatively deep. Consequently, the interface 104b is raised (high saltwater wedge).

These fluctuations modify the balance of the system. Thus, the two media 112 and 111 can be mixed by diffusion and can form a zone of salty water of variable thickness C around the interface 104. This zone, called "mixing zone" is the zone 115 of FIGS. 1a and 5.

Figure 5:
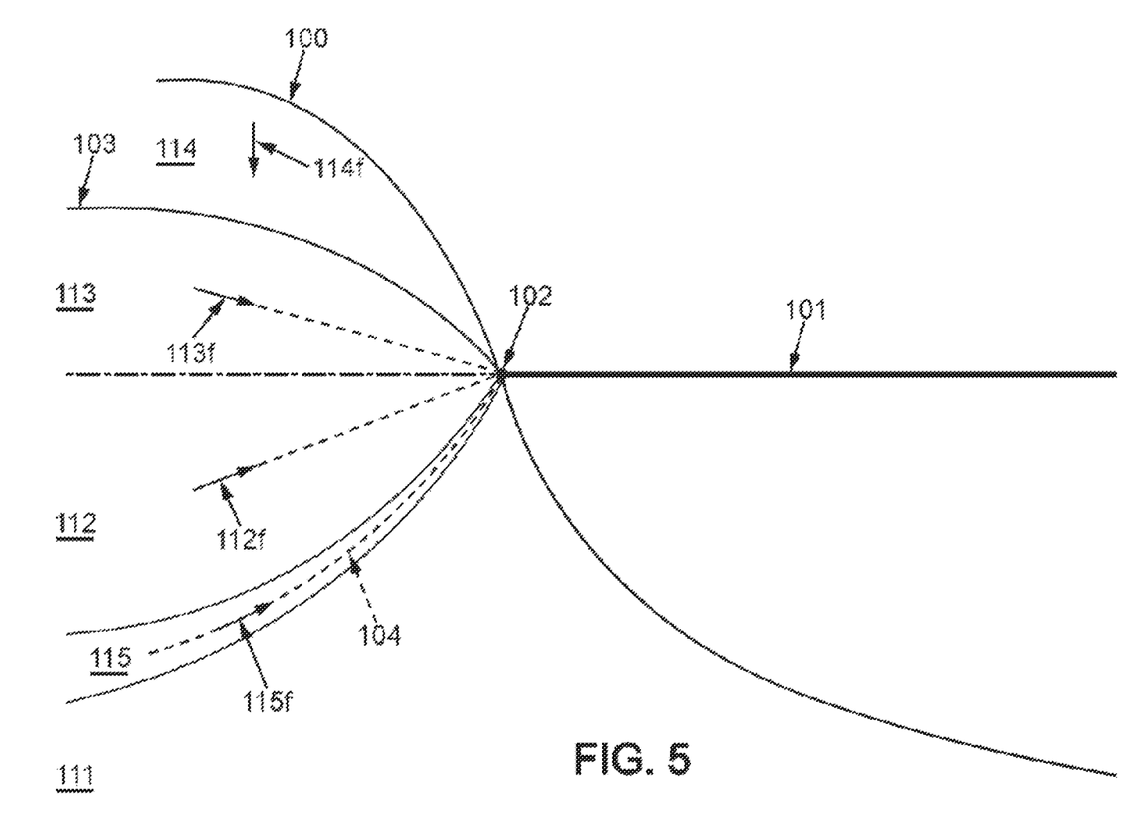
FIG. 5 presents different possible advective displacements in the zones of an insular geological model.

This mixing zone 115 has a strong characteristic for dissolving soluble rocks such as carbonates. Such dissolutions of the rock then cause cavities. For example, depending on the aggressivity of the particles contained in the water, dolomite CaMg(CO3)2 can be transformed into calcium carbonates CaCO3.

There is also a dissolution zone about the piezometric surface 103 dependent on the variation thereof over time.

In order to give an account of the soluble rock dissolution characteristic, it is possible to consider that the aggressivity of the particle, that is to say its dissolution power, depends on its position in the model. Thus, the agressivity of the particle is greater around the interfaces 103 and 104.

Thus, the aggressivity of the particle has a maximum in the mixing zone 115 around the interface 104. The same applies for the interface 103.

FIGS. 2a, 2b, 2c and 2d are an example of modification of a geological model in one embodiment of the invention.

Each of the FIGS. 2a, 2b, 2c and 2d presents the same vertical cross section (along the axis $\vec{z}$) of a geological model at different simulation times (respectively at the time t0, t1, t2, and t3).

In effect, since the earth's crust is not immutable on a scale measured by long time periods (for example, a few millennia), it can be useful to take into account the deformation of this crust to allow for a good simulation of the karstification in the geological model.

Figure 2A:
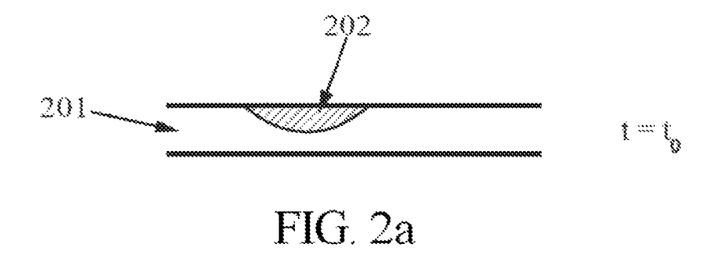
FIGS. 2a, 2b, 2c and 2d are examples of modification of a geological model in one embodiment of the invention.

FIG. 2a shows a geological model at a simulation time t0. This model consists at this simulation time of a single layer of sediments 201. After simulation, karst is formed in the lithological zone 202. Thus, this lithological zone 202 is fashioned by the dissolving of carbonates in the infiltration water. In effect, the water infiltrates through interstices of the rock and this infiltration increases the size of these interstices because of the dissolving of carbonates of the rock in the infiltrated water. Fractures and cavities can thus be formed. Such karstification zones are indicated in FIGS. 2a, 2b, 2c and 2d by shaded areas.

Figure 2B:
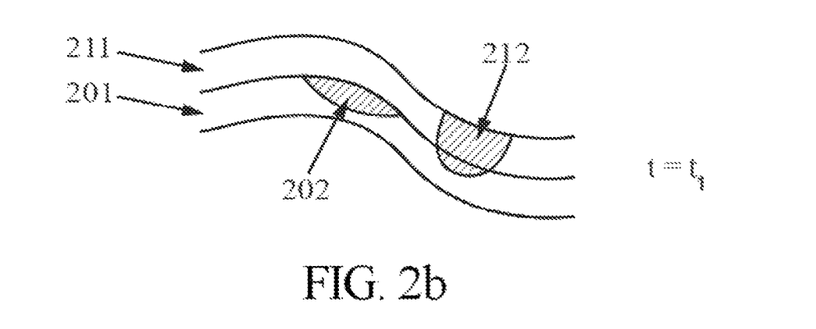

FIG. 2b shows the same cross section as FIG. 2a at a simulation time t1 (with t1 being later than t0). Because of sedimentation phenomena, a new geological layer of sediments 211 is deposited on top of the layer 201. Furthermore, the model has undergone a deformation making the geological layers 201 and 211 of the model "undulate". After simulation, a new karstification zone 212 is formed. This zone 212 contains rocks/sediments of the two lithographical layers 201 and 211.

Figure 2C:
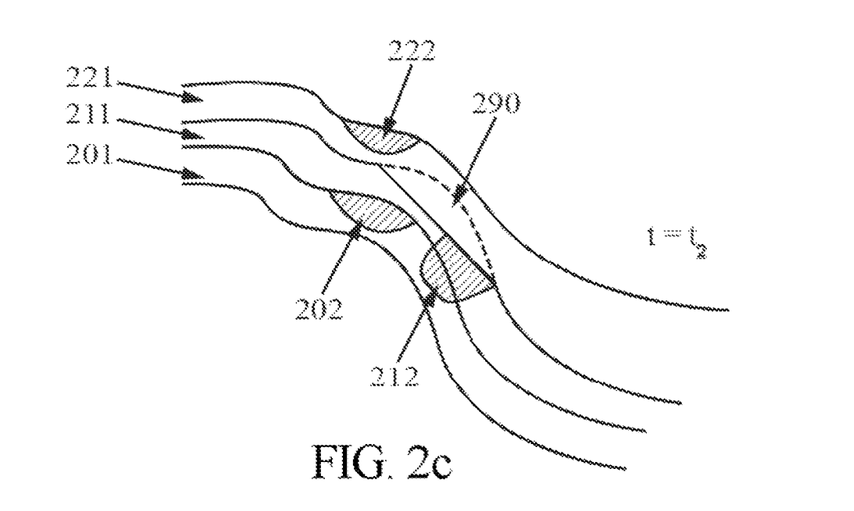

FIG. 2c presents the same cross section as FIG. 2a at a simulation time t2 (with t2 being later than t1). Similarly, a new geological layer of sediments 211 is deposited on the layer 211 and the model has undergone a new deformation. The zone 222 is a new karstification zone. Moreover, an erosion of the layer 211 has occurred between the simulation times t2 and t1. Thus, the zone 290 containing rocks/sediments of the layer of sedimentation 211 has been evacuated.

Figure 2D:
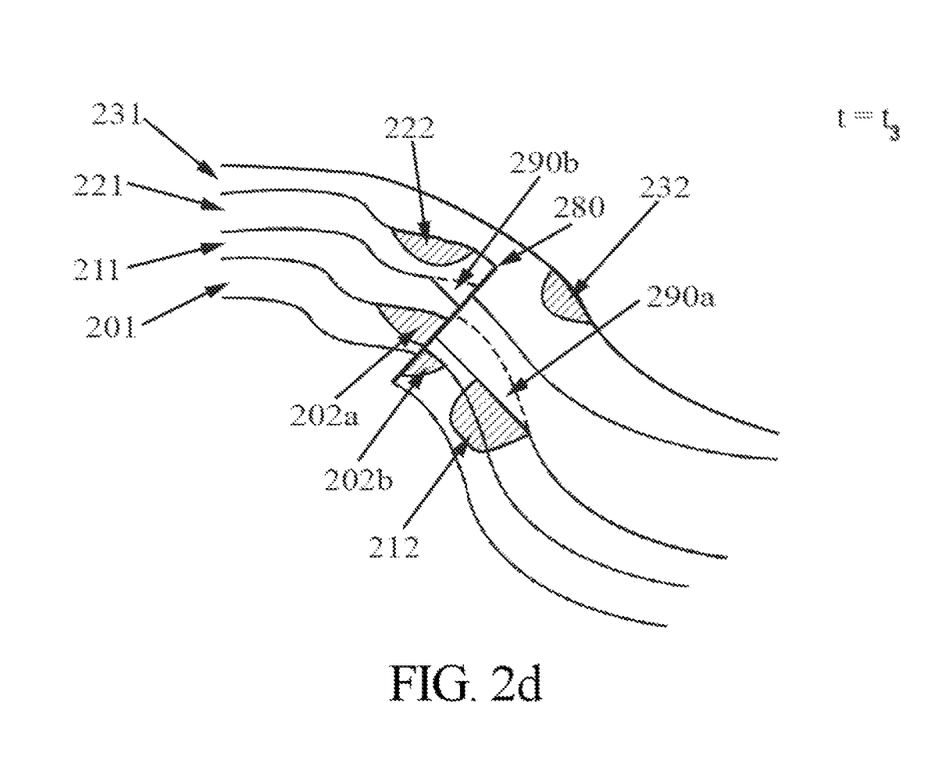

FIG. 2d shows the same cross section as FIG. 2a at a simulation time t3 (with t3 being later than t2). Finally, a new geological layer of sediments 231 is deposited on the layer 221 and the model has undergone a final deformation. The zone 232 is a zone that has undergone a karstification. Moreover, an oblique fault 280 (linked for example to a landslip or to an earthquake) has appeared between the simulation times t3 and t2. This fault 280 passes through the layers 201, 211, and 221. Thus, the zone 202 is split into two distinct sub-zones 202a and 202b.

Similarly, the eroded zone 290 is split into two eroded sub-zones 290a and 290b.

Because of various geological changes (deformations, erosions, fracturing, slips, earthquakes, etc.) over time, it can be useful to simulate the karstification phenomenon on a geological model that changes with the different simulation times. This change makes it possible to have karstification simulations with the result that is close to the geological reality.

Figure 3:
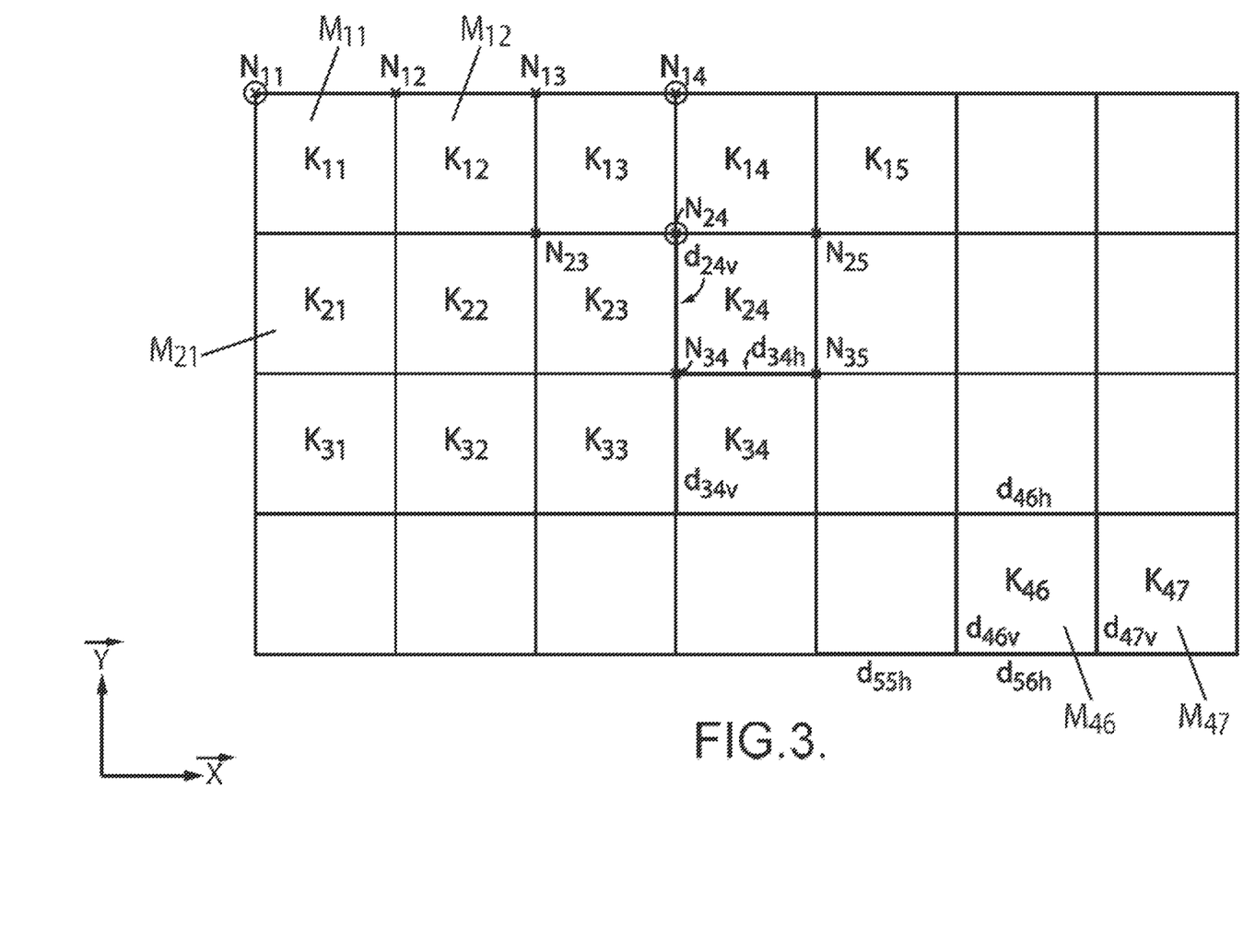
FIG. 3 is an example of representation of a meshed geological model.

FIG. 3 schematically shows an example of a meshed geological model according to one embodiment of the invention. This model can be used to simulate karstification phenomena.

The modeling of the karst zone by a geological model, for example meshed, can in effect be advantageous in the context of the simulation according to the embodiments of the invention. In effect, the meshing of a geological model allows for the simplified simulation by computer and software means that natively manipulate these meshes.

In this model, the displacement of particles is simulated on a network (or geological model). The particles represent the water infiltrated into the rock. Each particle can for example correspond to a water droplet, a water molecule, or another such particle.

The meshed geological model can be two-dimensional, as in the example illustrated in FIG. 2 for greater clarity, or advantageously three-dimensional.

The model of FIG. 3 comprises meshes M11, M12, M21, . . . , M46, etc.

In this embodiment, provision can be made to assign, by default, to each mesh Mij a mesh geological parameter value, here a permeability value Kij. The variables i and j make it possible to index the positions of the meshes in the space. Thus, each mesh M11, M12 . . . has a corresponding permeability value K11, K12, . . . . These permeability values make it possible to describe a first medium. The stochastic displacement of a particle in the first medium is probabilized by taking into account these permeability (or geological parameter) values, so as to simulate a flow in a porous rock, also called matrix. A second medium is described by edge parameter values, for example pipe diameters d24$v$ (vertical edge between the two nodes N24 and N34), d34$h$ (horizontal edge between the two nodes N34 and N35), etc.

The stochastic displacement of a particle in the second medium is probabilized by taking into account these pipe diameter values d24$v$, etc., so as to simulate a flow of water through fractures.

An example of simulation of the stochastic displacements on a network is described hereinbelow.

The particles can be introduced at a given node, for example N11, or else at several nodes. The particles can be introduced with a given periodicity.

For the purposes of simplification, provision can be made for the particles not to interact with one another, in other words for the displacement of one particle to be independent of the locations of the other particles.

In this embodiment, it is considered that the particles are subjected to two types of displacements: an advective displacement and a dispersive displacement.

The term "advective displacement" (respectively "advective direction") is used to mean the most probable displacement of the particle (respectively the most probable direction of the displacement of the particle).

For a given mesh, the advective displacement is likely to take place in a direction and a line given by a hydraulic gradient corresponding to the zone modeled, because this zone is saturated or not, or otherwise.

Figure 4:
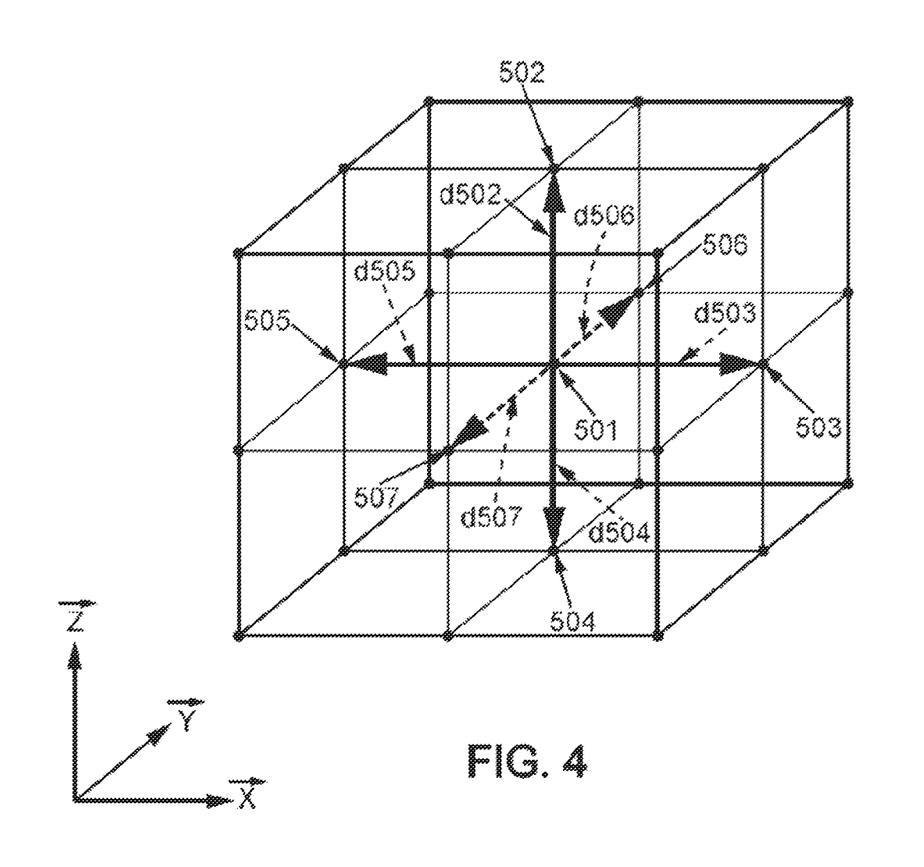
FIG. 4 is an example of advective movement and of dispersive movements of a particle for the simulation of its displacement in a meshed geological model.

FIG. 4 is an example of advective movement and of dispersive movement for the simulation of the displacement of a molecule in a three-dimensional meshed model in one embodiment of the invention.

In this example, a particle is located at point 501 in a regular cubic meshing of a geological model.

For this point 501 of coordinates (x501, y501, z501), the advective movement d502 is fixed and is directed vertically along the axis $\vec{z}$ toward the point 502. This advective movement indicates the preferred direction of displacement of the particle.

Moreover, the particle can also have a simulated movement or displacement in the five other directions. These movements are called dispersive movements:

a dispersive movement d503 along the axis $\vec{x}$ toward the point 503;

a dispersive movement d505 along the axis $\vec{x}$ toward the point 505;

a dispersive movement d506 along the axis $\vec{y}$ toward the point 506;

a dispersive movement d507 along the axis $\vec{y}$ toward the point 507;

a dispersive movement d504 along the axis $\vec{z}$ toward the point 504.

Obviously, other dispersive movements could be envisaged (for example, diagonal) if the simulation model allows it.

For each of the six movements mentioned above, a probability of displacement can be associated. This probability indicates the probability that the particle is displaced by this movement during the current simulation time. For example, the distribution of the probabilities can be, by way of illustration, as follows:

80% for the advective movement d502;

4.75% for each of the dispersive movements d503, d505, d506, d507, movements at right angles to the advective movement;

1% for the dispersive movement d504 opposite the advective movement.

Thus, if the particle is situated at the point 501 at the simulation time t0, it will have a probability of 1% of being located at the point 504 at the simulation time t0+1 (and a probability of 4.75% of being located at the point 503).

A random draw weighted by these probabilities is then performed, and the displacement takes place in the direction and the line given by the result of the random draw.

By iterating this displacement computation for each of the simulation times, the stochastic trajectory of a particle can be determined in the model throughout the simulation. These computations of stochastic displacements are performed for each particle, and repeated cyclically.

Furthermore, at each cycle, called time step, a large number of particles can be introduced into the model ($10^9$ particles for example). The number of time steps can be of the order of a million. The number of meshes of the network can, for example, be of the order of a hundred thousand or so or a million.

When simulating the displacement of a particle situated on a mesh, it is possible to estimate a probability of advective displacement. A random draw weighted by this estimated probability is then performed, and the advective displacement takes place or not depending on the result of the random draw.

This probability can vary according to the zones (114, 113, 112, 111) or even according to the position of the particle in a zone.

This probability can also be a function of an equivalent permeability parameter Keq. Thus, for a displacement between two nodes of the first medium, provision can be made to compute an equivalent permeability Keq from the permeability values of the meshes including these two nodes. For example, for a displacement from the node N14 to the node N24, an equivalent permeability is computed from the values K13, K14. It is also possible, by convention, to take only one of the values out of K13 and K14 into account.

In the case of a three-dimensional network, the equivalent permeability can be computed from four permeability values. There is then a change from a volume model to a grid model (or "voxcel"). The equivalent permeability for a given displacement in the first medium can, in particular, be an average, for example an arithmetical or geometrical average, of the permeabilities of the meshes including an edge corresponding to this displacement.

For a displacement in the second medium, that is to say a displacement along a pipe, for example from the node N24 to the node N34, it possible to deduce an equivalent permeability value Keq, from the pipe diameter corresponding to this displacement. For example, the equivalent permeability Keq can be expressed by $$K_{eq} = 2 \log\left(\frac{1.9}{r}\right)\sqrt{2gd},$$

r being the relative roughness, typically equal to 0.2, and g an acceleration that can be the acceleration of gravity (typically in the zone 114) or be linked to a driving force (typically in the zones 113, 112 and 115).

The probability of advective displacement Prob_Adv, also called "velocity module", can also be estimated from the equivalent permeability values:

−Prob_Adv ($K_{eq}$) = 0 if $K_{eq}$ is less than $K_{min}$,

−Prob_Adv ($K_{eq}$) = 1 if $K_{eq}$ is greater than $K_{max}$, and

− Prob_Adv($K_{eq}$) $\frac{\log(K_{eq}) - \log(K_{min})}{\log(K_{max}) - \log(K_{min})}$ in the other cases.

The thresholds Kmin and Kmax for the first medium can be more or less close together than the thresholds Kmin and Kmax for the second medium.

FIG. 5 presents examples of advective displacements in the different zones of an insular model:
For a mesh corresponding to the zone 114, the advective displacement is likely to take place in the direction and the line of the gravity vector (arrow 114f);
For a mesh corresponding to the mixing zone 115, the advective displacement is likely to take place in the direction from the interface 104 and to the outlet (arrow 115f).
For a mesh corresponding to the water table zone (zones 112 and 113), the advective displacement is likely to take place in the direction of and toward the outlet (arrows 112f and 113f).

The advective displacements can be tangential to level curves passing through the outlet. For example, the arrow 115f is tangential to the curve 104.

If, in two dimensions, the advective displacement can be represented by a single arrow, in three dimensions the advective displacement can be contained in a three-dimensional (or 3D) surface, particularly for the advective movements 113f, 112f, and 115f. In effect, in three dimensions, numerous outlets are possible (intersection of the sea level 101 with the lithographic grid forming the island 100). Thus, for each possible outlet, there is a possible different advective movement.

To this advective displacement described previously are added dispersive displacements, likely to take place in several directions.

For example, by accepting an advective displacement from the node N24 to the node N34, a dispersive displacement is likely to occur toward the N14, toward the node N23 or toward the node N25 (for example). Obviously, the probabilities of a dispersive displacement to the nodes cited do not necessarily have the same probability.

For each of these nodes $N_{ij}$, it is then possible to estimate a probability $$\text{Prob\_Disp\_ij}(K_{eq}^{i,j}) = \frac{\log(K_{eq}^{i,j})}{\sum_{i,j} \log(K_{eq}^{i,j})}$$

in which $K_{eq}^{i,j}$ denotes the equivalent permeability for the displacement from the node N24 to the node $N_{ij}$, estimated in the first medium from the permeability values of the meshes that have an edge corresponding to this displacement, and in the second medium from the diameter of the pipe corresponding to this displacement, and in which the sum $$\sum_{i,j} \log(K_{eq}^{i,j})$$

is performed on the various possibilities of dispersive displacement.

To resume the preceding example, this sum comprises three terms. In a three-dimensional network, this sum would have five terms.

In this case, the values $K_{eq}^{2,3}$ and $K_{eq}^{2,5}$ would be computed from the values K13, K23, and K14, K24, respectively, whereas the value $K_{eq}^{3,4}$ corresponding to a displacement along a pipe would be computed from the value d24v.

If the model comprises a matrix and fractures (or discontinuities), a particle can pass from the matrix to the fracture. In the reverse direction, it will be noted that, given the usual permeability and pipe diameter values, a particle has relative few chances of passing from a discontinuity to the matrix.

The values of the geological parameters (here the permeability) of the first medium and of the second medium are modified according to the paths taken by the particles.

In particular, provision can be made to assign each mesh a value of a karstification index IK indicative of the dissolution potential (if appropriate, precipitation potential, potential for change of lithology) of the rock. This index can have similar or equal values for the meshes of a given zone.

Also, provision can be made to assign each particle a particle aggressivity value IA.

Typically, this aggressivity has one and the same value for all the particles, but it is also possible to provide different values, for example to account for a period of acid rain. Furthermore, this aggressivity can also depend on the zone in which the particle is located (i.e. the position/the coordinates of the particle in the grid). For example, the aggressivity of the particle can be maximal in the zones 114 and 115 whereas it is minimal in the zones saturated with fresh water (zones 113 et 112).

The passage of a particle between two nodes of the first medium modifies the permeability values of the meshes that have an edge corresponding to this node.

The passage of a particle in a pipe of the second medium increases the diameter of this pipe, possibly within the limit of a maximum diameter. For example, this maximum diameter can be equal to the size of a mesh side. A cavity of a size greater than the size of a mesh can thus be modeled by pipes of diameter equal to the maximum diameter. For example, the meshes M46, M47 of FIG. 2 may correspond to such a cavity.

In both cases, the volume of matter extracted by the passage of the particle is a function of the product IK.IA.

Moreover, the functional diagram presented in FIG. 6 is a typical example of a program in which certain instructions can be performed on plotting equipment and others, on mobile equipment. To this end, FIG. 6 can correspond to the flow diagram of the general algorithm of a computer program within the meaning of the invention.

In this embodiment of the invention, a geological model is supplied (step 601) in a computer format, for example in the form of a meshed model. Depending on the sea level, and on the density contrast between the sea water and the fresh water, it is possible to determine different zones/surfaces of interest in the model (step 602). For example, the following are determined:

the mixing zone according to the "Ghyben-Herzberg" law described above. Its thickness (C in FIG. 1a can be constant or be a function of its depth relative to the sea level (B in FIG. 1a);

the piezometric surface.

Once this model is established, a simulation of displacement of a particle during a simulation time can be performed (step 603). This particle is introduced into the geological model in an infiltration zone, typically a zone situated at the top of the island 100. During its simulated displacement, the aggressivity of the particle takes different values as a function of its position in the model. In particular, this value will be high when the particle is located in the mixing zone or in a zone close to the piezometric surface.

During its displacement and as a function of its aggressivity, the particle will partially dissolve the rock in which it is displaced. Thus, the geological parameters of the model are modified by this simulation (step 604).

Obviously it is possible for one and the same simulation time to proceed with a large number of displacement simulations for multiple particles. Thus, as long as the parameterized number of particles is not reached (test 605), the steps 602, 603 and 604 are reiterated for a new particle.

Similarly, it is possible to perform these iterations for different simulation times (for example with steps of fifty years or of five thousand years). Thus, as long as the final simulation time is not reached or exceeded (test 606)) the steps 602, 603 and 604 are reiterated for a new simulation time (step 607). Before then, the geological model may evolve (step 608) between the preceding time and the current time (for example, because of the modeling of an earthquake or of erosion).

Finally, the simulation method turns over the model by revealing the zones that have undergone the karstification phenomenon.

Figure 7:
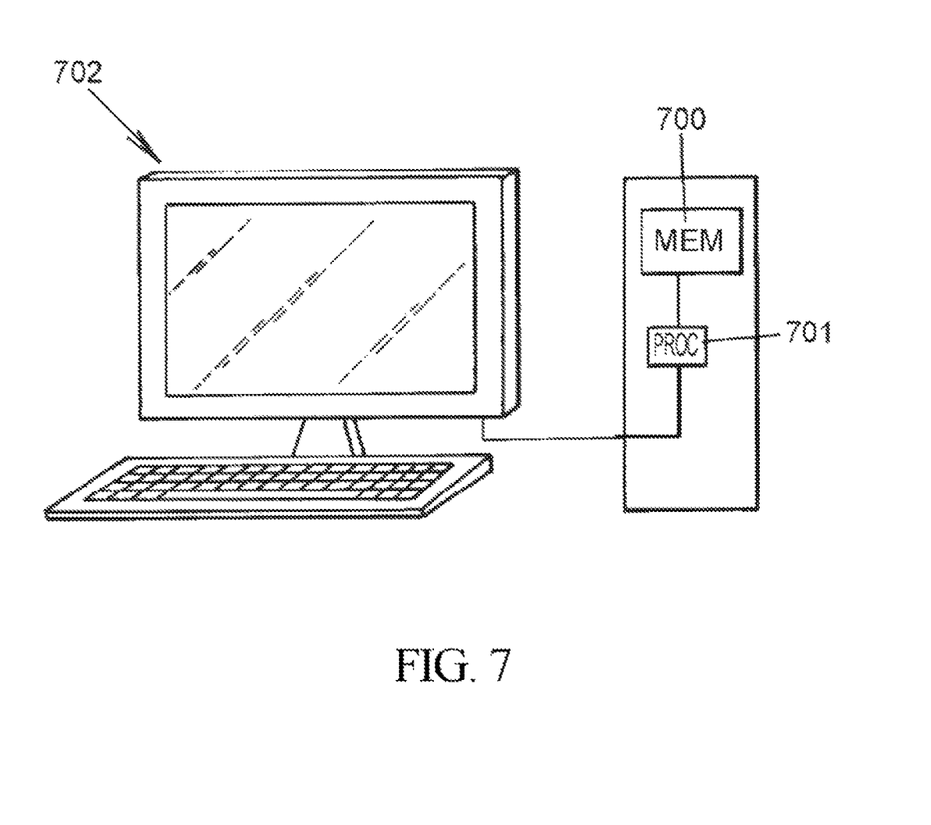
FIG. 7 represents an exemplary simulation device.

FIG. 7 represents an example of a simulation device 702. In this embodiment, the device comprises a computer 702 comprising a memory 700 to store the meshed geological model, and processing means, for example a processor 701, to perform the simulations according to the method described previously and modify the model.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method implemented by computer for simulating karstification phenomena in a real insular karst zone, comprising:

a/ receiving a geological model of the karst zone, this model comprising at least one local geological parameter that is a function of the local coordinates in this model;

b/ simulating the displacement of a particle in the geological model, said particle having coordinates in said model, said displacement being probabilized by taking into account:
   at least the local geological parameter, and
      at least one advective direction, this advective direction being a function of said coordinates of the particle in the geological model;
      in which the simulation of the displacement of the particle is performed for a plurality of simulation times, and in that the geological model defined is a function of a particular simulation time;

c/ modifying the geological parameter according to the displacement of the particle and according to an aggressivity of the particle, said aggressivity being a capacity of the particle to erode rocks;
   in which the aggressivity of the particle is a function of said coordinates of the particle, and d/ determining an evolving of the geological model between a current time and a previous time based on the plurality of simulation times of steps /b/ and /c/;

e/ determining zones of the subsoil exhibiting lithological characteristics to form hydrocarbon traps based on step d.

2. The method as claimed in claim 1, in which the geological model is meshed and in which the geological parameter is a function of at least one mesh in contact with the displacement of the particle.

3. The method as claimed in claim 1, in which the geological parameter is a function of a direction in which the displacement of the particle is simulated.

4. The method as claimed in claim 1, in which the steps b/ and c/ are performed for a plurality of particles.

5. The method as claimed in claim 1, in which the method further comprises:

f/ determining a mixing zone between a first sub-part of the geological model and a second sub-part of the geological model, the first sub-part of the geological model modeling a sub-part comprising salt water and the second sub-part of the geological model modeling a sub-part comprising fresh water,
   the first sub-part of the geological model modeling the sub-part comprising salt water comprising a zone adjacent to this mixing zone;
   the second sub-part of the geological model modeling the sub-part comprising fresh water comprises a zone adjacent to this mixing zone;
   and in which the aggressivity of the particle exhibits a local maximum in the mixing zone in a zone resulting from the union of:
   the adjacent zone of the first sub-part,
   the adjacent zone of the second sub-part, and
   the mixing zone.

6. The method as claimed in claim 5, in which the simulation of the movement of the particle is performed for a plurality of simulation times, and in that at least one sub-part out of the first sub-part and the second sub-part is a function of the particular simulation time.

7. A device for simulating karstification phenomena in a real insular karst zone, said device being configured to implement the following steps;
a/ receiving a geological model of the karst zone, this model comprising at least one local geological parameter that is a function of the local coordinates in this model;
b/ simulating the displacement of a particle in the geological model, said particle having coordinates in said model, said displacement being probabilized by taking into account:
at least the local geological parameter, and
at least one advective direction, this advective direction being a function of said coordinates of the particle in the geological model;
in which the simulation of the displacement of the particle is performed for a plurality of simulation times, and in that the geological model defined is a function of a particular simulation time;
c/ modifying the geological parameter according to the displacement of the particle and according to an aggressivity of the particle, said aggressivity being a capacity of the particle to erode rocks;
in which the aggressivity of the particle is a function of said coordinates of the particle, and
d/ determining an evolving of the geological model between a current time and a previous time based on the plurality of simulation times of steps /b/ and /c/;
e/ determining the hydrocarbon traps of the subsoil through complex periods and events based on step /d/.

8. A non-transitory computer readable storage medium, having stored thereon a computer program comprising program instructions, the computer program being loadable into a data-processing unit and adapted to cause the data-processing unit to carry out, when the computer program is run by the data-processing device:
a/ receiving a geological model of a real insular karst zone, this model comprising at least one local geological parameter that is a function of the local coordinates in this model;
b/ simulating the displacement of a particle in the geological model, said particle having coordinates in said model, said displacement being probabilized by taking into account:
at least the local geological parameter, and
at least one advective direction, this advective direction being a function of said coordinates of the particle in the geological model;
in which the simulation of the displacement of the particle is performed for a plurality of simulation times, and in that the geological model defined is a function of a particular simulation time;
c/ modifying the geological parameter according to the displacement of the particle and according to an aggressivity of the particle, said aggressivity being a capacity of the particle to erode rocks;
in which the aggressivity of the particle is a function of said coordinates of the particle,
d/ determining an evolving of the geological model between a current time and a previous time of the plurality of simulation times based on steps /b/ and /c/;
e/ determining the hydrocarbon traps of the subsoil through complex periods and events based on step /d/.

* * * * *